Figure 3:
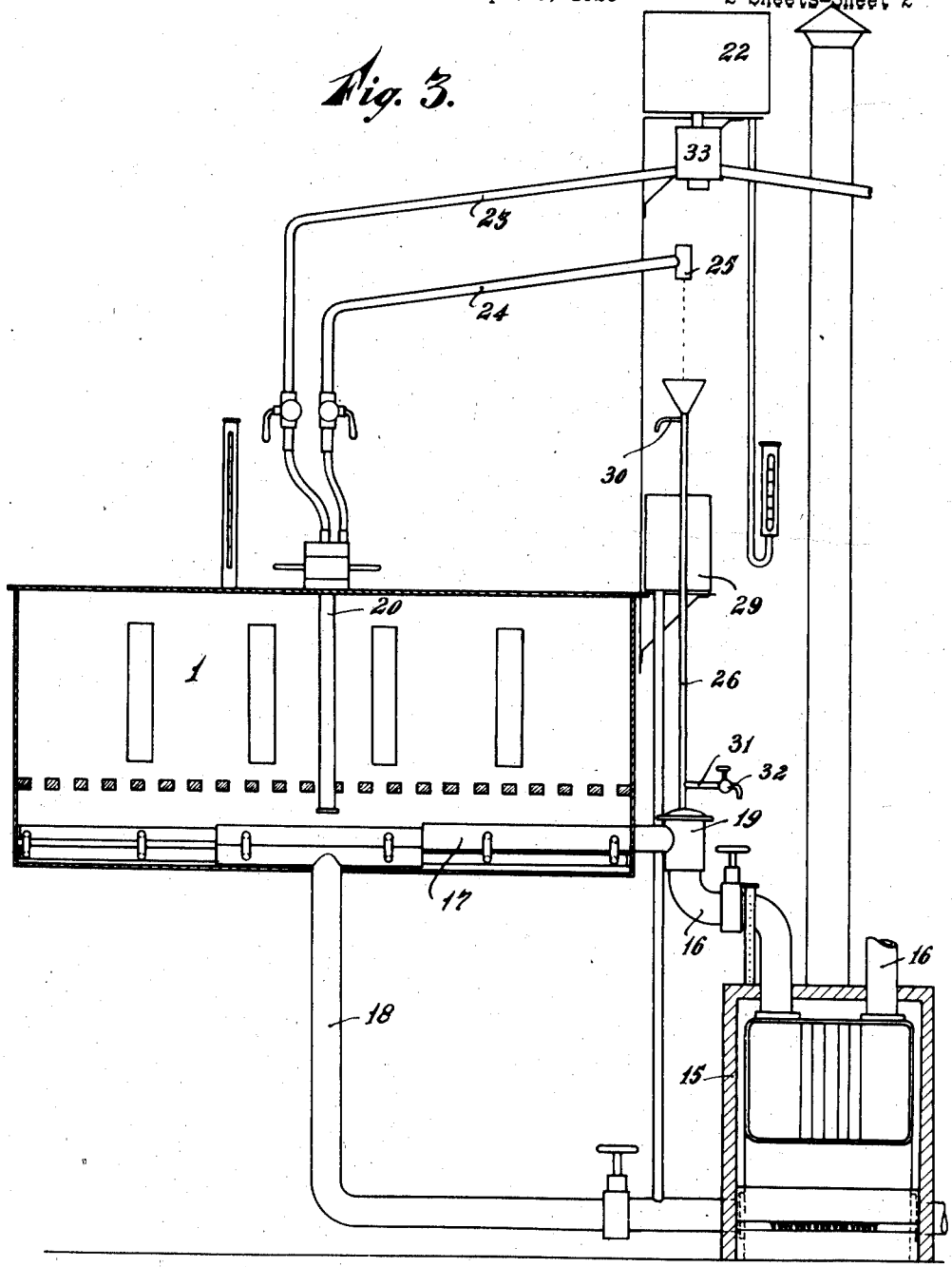

Feb. 28, 1928.
P. J. G. NELL ET AL
1,661,140
PROCESS OF STERILIZING VEGETABLE PRODUCTS
Filed Sept. 9, 1926    2 Sheets-Sheet 1
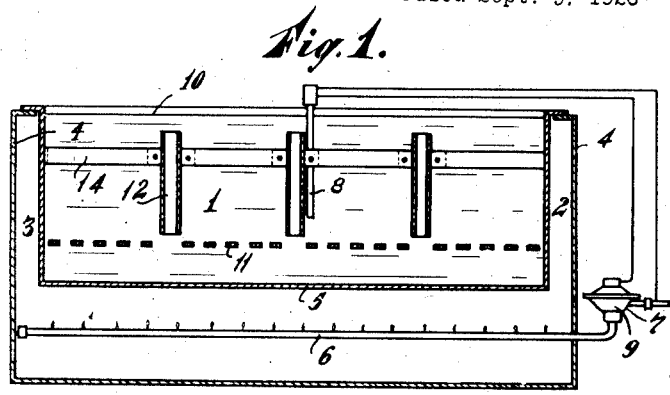
Fig. 1.
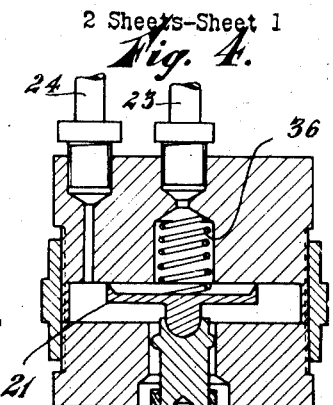
Fig. 4.
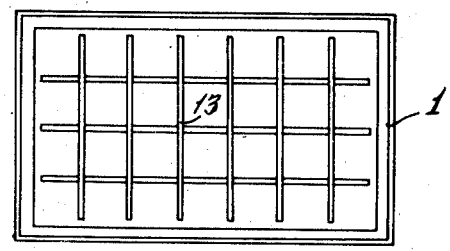
Fig. 2.
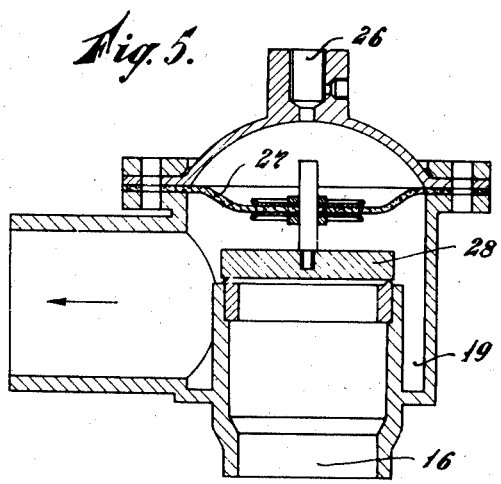
Fig. 5.
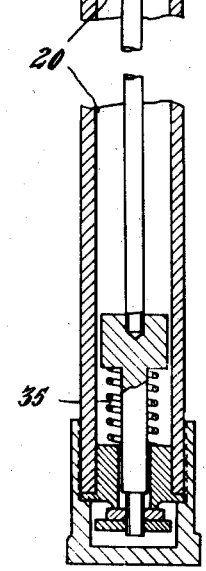
P. J. G. Nell and
D. J. Schouten
INVENTORS
By Marks & Clerk
Attys.

Feb. 28, 1928.
1,661,140

P. J. G. NELL ET AL

PROCESS OF STERILIZING VEGETABLE PRODUCTS

Filed Sept. 9, 1926  2 Sheets-Sheet 2

P. J. G. Nell and
D. J. Schouten
INVENTORS

By: Marks & Clerk
Attys.

Patented Feb. 28, 1928.

1,661,140

UNITED STATES PATENT OFFICE.

PIETER JOHANNES GERARDUS NELL, OF THE HAGUE, AND DIRK JAN SCHOUTEN, OF LISSE, NETHERLANDS.

PROCESS OF STERILIZING VEGETABLE PRODUCTS.

Application filed September 9, 1926, Serial No. 134,561, and in the Netherlands January 13, 1925.

The invention relates to a process of sterilizing vegetable products and more specially bulbs by means of hot water.

This method is generally known. The bulbs are exposed for some hours to a heating by hot water at a temperature of about 110° F.

However, when applying this method, it is difficult to obtain in a large compact quantity of bulbs a uniform temperature.

The invention consists in what is hereinafter described with reference to the accompanying drawings and pointed out in the claims of this specification and has for its object to provide a method of sterilizing bulbs or other vegetable products in such a way that large quantities may be treated in one operation.

In the drawings Fig. 1 is a vertical longitudinal section of an apparatus with gas heating; Fig. 2 is a plan view of a container of modified construction; Fig. 3 is an elevation of an embodiment of the apparatus with hot water heating (partially in section); Figs. 4 and 5 are vertical sections of details of the apparatus.

The container 1 as shown in Fig. 1 has double walls, so that the heating gases may ascend through the spaces 2 and 3 and may escape through openings 4, thereby heating all of the walls.

Underneath the bottom 5 gas burners 6 for heating the water are located. The gas supply at 7 for the gas burners 6 is controlled by a regulator 9 by means of a thermostat 8 situated in the container 1.

At some distance from the bottom of the container 1 a wooden grate 11 is arranged, upon which the bags (not shown) for containing the bulbs to be treated are adapted to be placed. The container is filled with water to such a height that the level 10 reaches above the bulbs to be treated.

Vertical pipes 12 are further arranged within the container at predetermined distances apart in longitudinal and transverse rows. The lower ends of these pipes terminate in closely spaced relation to the upper surface of the grate 11, while the upper ends terminate shortly below the water level 10 in the container 1.

The bags or baskets (not shown) filled with bulbs are adapted to be placed on the wooden grate 11 between the pipes 12, and the water on being heated passes upwardly in the container through the pipes and the bags containing the bulbs.

The pipes 12 may be secured to the walls of the container and to each other by means of clamping brackets 14.

The same result as regards a satisfactory water circulation between the bags or baskets containing the bulbs may be obtained by using vertically disposed intersecting partitions instead of pipes. These partitions 13 are shown in Fig. 2.

In Fig. 3 an apparatus is shown in which the water in the container 1 is heated by hot water. To this end a hot water stove is arranged, from which the hot water is supplied through the conduit 16 to the heating element 17, located underneath the grate 11 in the container 1, while it is returned through the conduit 18 back to the hot water stove 15.

In the conduit 16 within a chamber 19 the main closing valve for the heating water is arranged. The position of this closing member is governed by the thermostat 20 arranged in the container 1. This thermostat comprises a valve 21 (Fig. 4) which, dependent on the temperature in the container, controls a secondary flow of water from the tank 22 through the conduit 23, valve 21, conduit 24 and overflow 25. From this overflow the water falls into a tube 26 the upper end of which is enlarged and funnel shaped, and presses upon the diaphragm 27 (Fig. 5) arranged in the chamber 19 and connected to the main supply valve 28.

The diaphragm 27 divides the chamber 19 into two portions. Above the diaphragm the pressure is equal to that of the water column in the tube 26; underneath the diaphragm there is the pressure of the hot water stove 15 corresponding to that of the expansion reservoir 29, which is located lower than the tank 22. To the tube 26 two overflow pipes 30 and 31 are connected, the lowermost 31 of which is provided with a controlling cock 32.

The operation of the device is as follows:

As soon as the temperature in the container 1 surpasses a predetermined limit, the valve 21 opens and water flows from the tank 22 through a filter 33, located underneath the tank, conduits 23 and 24 and through the overflow 25 into the tube 26. According as the supply is increased it surpasses the discharge through 31 and 32 and the water will rise in the tube 26. The pressure on the diaphragm 27 now becomes larger than that under the diaphragm and the valve 28 is closed, whereby the circulation of the stove water in the heating element 17 is interrupted.

If the temperature in the container 1 sinks then the thermostat causes a reverse operation. The discharge of water from the tube 26 through the cock 32 surpasses the supply, the tube 26 becomes gradually empty and the pressure above the diaphragm 27 decreases, whereby the valve 28 is closed.

The entire operation is independent from the temperature of the water in the hot water stove 15.

The tube 30 serves as an overflow in the case the water in 26 might ascend too high. By means of the cock 32 it is possible to regulate the speed at which the water will ascend in the tube 26.

Fig. 3 illustrates a device in which two containers 1 are connected to the hot water stove 15. For the sake of simplicity one container has been omitted from the drawing.

The thermostat shown in Fig. 4 needs but few further explanations as in principle it is no departure from the known apparatuses. In consequence of the difference in expansion the valve 21 by a variation of temperature will be carried along by the rod 34. The valve and the rod are held together mainly by the springs 35 and 36. If the valve 21 is opened, then the water supplied through 23 will be delivered through the connection 24.

It will be clear that the device is not only adapted for the treatment of bulbs but also for other vegetable products, as for instance portions of sugar cane. It is however essential that a satisfactory circulation of the water in the container between the material to be treated and a satisfactory regulation of the temperature of the sterilizing water is obtained.

I claim:

A process of sterilizing vegetable products such as bulbs, consisting in arranging a plurality of bags of the bulb material to be treated in a water container, maintaining the bags above the bottom of the container and in spaced relation to each other so as to permit of circulation of the water, heating the water in the container to a temperature of approximately of 110° F., and maintaining the water in such heated condition for a period of approximately three hours.

In testimony whereof we affix our signatures.

PIETER JOHANNES GERARDUS NELL.
DIRK JAN SCHOUTEN.